United States Patent
Breuninger

(10) Patent No.: US 9,280,414 B2
(45) Date of Patent: Mar. 8, 2016

(54) COMBINATION OF ERROR CORRECTION AND ERROR DETECTION FOR TRANSMITTING DIGITAL DATA

(75) Inventor: Matthias Breuninger, Stuttgart (DE)

(73) Assignee: AS-International Association e.V., Gelnhausen (DE)

( * ) Notice: Subject to any disclaimer, the term of this patent is extended or adjusted under 35 U.S.C. 154(b) by 275 days.

(21) Appl. No.: 14/002,403

(22) PCT Filed: Feb. 27, 2012

(86) PCT No.: PCT/EP2012/000840
§ 371 (c)(1),
(2), (4) Date: Oct. 2, 2013

(87) PCT Pub. No.: WO2012/116802
PCT Pub. Date: Sep. 7, 2012

(65) Prior Publication Data
US 2014/0053031 A1   Feb. 20, 2014

(30) Foreign Application Priority Data

Mar. 1, 2011 (DE) .......................... 10 2011 012 766
May 5, 2011 (EP) ..................................... 11003691

(51) Int. Cl.
| | |
|---|---|
| H03M 13/00 | (2006.01) |
| G08C 25/02 | (2006.01) |
| G06F 11/00 | (2006.01) |
| G06F 11/10 | (2006.01) |
| G05B 19/042 | (2006.01) |
| H04L 5/00 | (2006.01) |
| H04L 5/06 | (2006.01) |
| G06F 13/364 | (2006.01) |

(52) U.S. Cl.
CPC ............ *G06F 11/10* (2013.01); *G05B 19/0423* (2013.01); *G06F 13/364* (2013.01); *H04L 5/0007* (2013.01); *H04L 5/0037* (2013.01); *H04L 5/06* (2013.01); *G05B 2219/25136* (2013.01)

(58) Field of Classification Search
CPC . G05B 19/0423; G06F 13/364; H04L 5/0007; H04L 5/0037
USPC ......... 714/748, 704, 705, 751, 752, 780, 756, 714/758, 759, 804, 782
See application file for complete search history.

(56) References Cited

U.S. PATENT DOCUMENTS 7,076,718 B2 * 7/2006 Miyoshi ......................... 714/748
7,434,137 B2 * 10/2008 Itoh et al. ...................... 714/755
(Continued)

FOREIGN PATENT DOCUMENTS

| | | |
|---|---|---|
| DE | 100 32 533 A1 | 1/2002 |
| EP | 1 170 870 A1 | 1/2002 |
| WO | 01/97385 A2 | 12/2001 |

OTHER PUBLICATIONS

International Search Report of PCT/EP2012/000840, date of mailing Nov. 28, 2012.
International Preliminary Report on Patentability of PCT/EP2012/000840, date of issuance Sep. 3, 2013.

*Primary Examiner* — Christine Tu
(74) *Attorney, Agent, or Firm* — Collard & Roe, P.C.

(57) ABSTRACT

The invention relates to a method for transmitting digital data, in particular in automation technology, in which a digital code word (R) received via a channel is corrected and verified as to its validity by means of a channel decoder (7), and an invalid code word is rejected and optionally requested once again, while a valid code word (C") is further processed. If a metric (8) is cumulatively used with an encoding process, the probability of remaining bit errors in the whole method can be significantly reduced, thus making it possible to use the method in automation technology.

13 Claims, 2 Drawing Sheets

(56) References Cited

U.S. PATENT DOCUMENTS

| | | |
|---|---|---|
| 7,885,605 B2 * | 2/2011 | Suzuki et al. ............... 455/63.1 |
| 2002/0168033 A1 | 11/2002 | Suzuki et al. |
| 2006/0212781 A1 | 9/2006 | Hewitt et al. |
| 2008/0294967 A1 | 11/2008 | Tomlinson et al. |
| 2011/0078531 A1 * | 3/2011 | Umeda et al. ............... 714/751 |

* cited by examiner

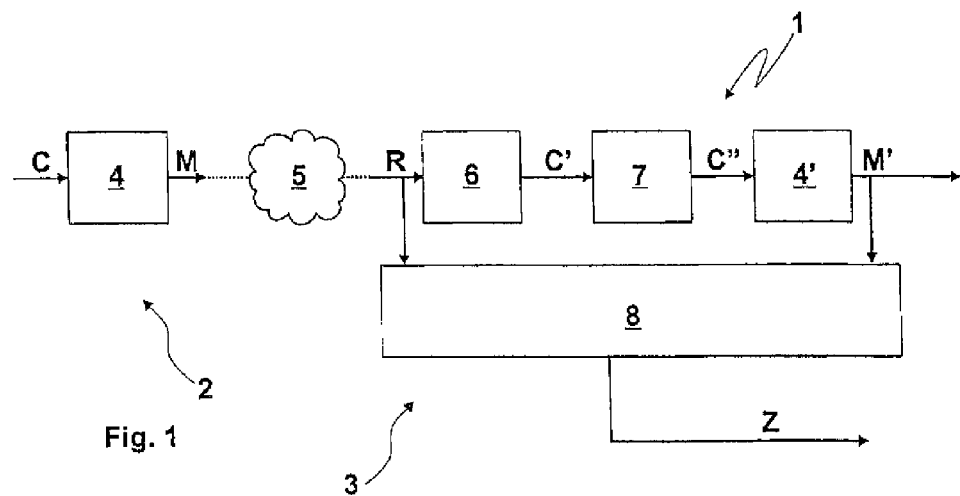
Fig. 1
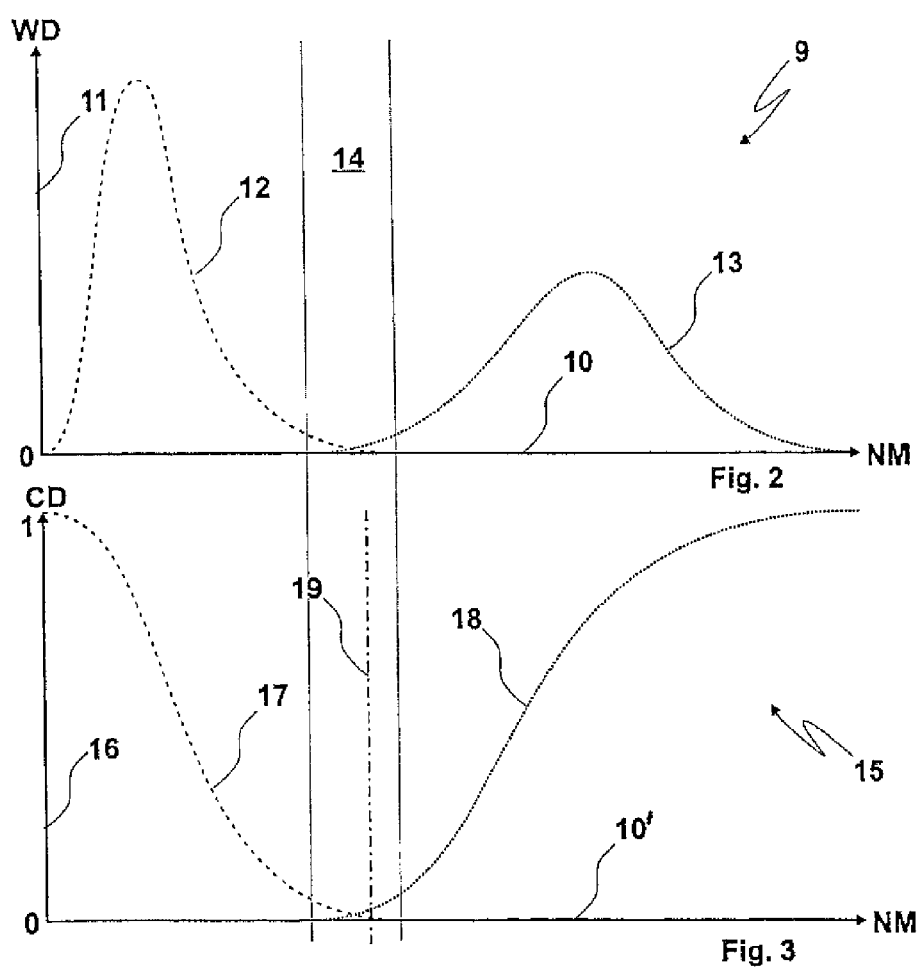
Fig. 2
Fig. 3

COMBINATION OF ERROR CORRECTION AND ERROR DETECTION FOR TRANSMITTING DIGITAL DATA

CROSS REFERENCE TO RELATED APPLICATIONS

This application is the National Stage of PCT/EP2012/000840 filed on Feb. 27, 2012, which claims priority under 35 U.S.C. §119 of German Application No. 10 2011 012 766.6 filed on Mar. 1, 2011, and European Application No. 11003691.0 filed on May 5, 2011, the disclosures of which are incorporated by reference. The international application under PCT article 21(2) was not published in English.

The present invention refers to a process of transmitting digital data, in particular for use in automation technology, and to a receiver and a transmitter, respectively, which are operated by said process.

From DE 100 32 533 A 1, a communication system is known including a master and several slaves which communicate with each other via a two-wire bus. There, the slave information is checked for mutilation by alternating bit patterns, and non-mutilated pieces of information are combined to safety-relevant output signals. Actor-sensor-interface systems of this type are also described in Kriesel, W., Madelung O. W., AS-Interface, Das Aktuator-Sensor-Interface für die Automatisierung, Hanser Verlag, 2nd revised edition, 1999.

A disadvantage of prior art solutions is the limitation of the number of the possible devices to be excluded, and/or the limitation of possible usable line distances. Furthermore, some of the communication technologies used are outdated and sometimes fail to provide for an improved data communication rate.

Therefore, there is a growing need for data communication methods which enable an increased data communication rate by more up-to-date technologies, without the necessity to lower the safety requirements of data communication, which are especially high in automation technology.

One aspect of the present invention therefore suggests, in a process for transmitting digital data, especially in automation technology, to use a channel decoder to correct and verify for validity a digital, noisy code word received via a channel. A non-valid code word is rejected, and the received, noisy code word is newly requested, if necessary, while a valid code word is further processed. By the use of metrics, a measure can be obtained from the received noisy code word and the valid code word. The valid code word may be rejected and the received, noisy code word may be newly requested, if said measure is as high or higher as a predetermined threshold.

Advantageously, the introduced metrics enable a minimization of non-recognized residual errors. After the channel decoder has decoded and classified as valid a channel-received code word, the channel decoder is actually not able to decide whether the found, valid code word is the originally sent code word or not. In case a mutilated code word has been declared valid by the channel decoder, this error can therefore not be immediately detected. The purpose of said metrics is to recognize errors unrecognized by the channel decoder and therefore to significantly minimize the residual error, i.e. the number of remaining non-recognized errors.

The term automation technology refers to a field of engineering which serves to automate machines or equipment. Meanwhile, in order to automate machines or equipment, single components such as sensors, controllers or actuators, have to interchange data. Said data are typically digital data. However, an incorrect data communication may mutilate the contained information and result in machine or equipment damage, as well as in high rejection rates of the items produced on said machines and equipment. Moreover, said data may be safety-relevant, meaning that mutilated information may lead to a risk of injury of operators or people in the surroundings of said machine or equipment. As a result thereof, an extremely small probability of residual bit errors is required for data communication in the field of automation technology in order to guarantee smooth operation of machines and equipment without failures and without safety-related problems. If the required small probability of residual bit errors cannot be achieved by a data communication method, said method is not suited for automation technology.

The term channel may, on the one hand, refer to a physical data line connecting at least two components of an equipment or machine. It may, on the other hand, also refer to a radio channel, in which case data communication will take place via said channel by using radio technology.

The term code word refers to a data word consisting of at least one bit which has been encoded by a channel encoder. Having said data word encoded into a code word by a channel encoder in a transmitter results in a code word structure containing redundancies and enabling a correction and validation by at least one channel decoder in a receiver, on the basis of corresponding algorithms, and reduces the number of residual data communication errors. Channel encoding/decoding therefore serves to correct incorrectly transmitted code words, and therefore to improve the safety of data communication. As a result thereof, an invalid code word means a code word which has no valid structure even after a correction by said channel decoder, and which has therefore been changed during the data communication process to a degree which prevents the construction of a valid code word. An invalid code word has therefore been recognized as incorrectly transmitted and not suited to be further processed, such that it may have to be newly requested from the transmitter and newly communicated. A valid code word, either corrected or non-corrected, has a valid structure and has therefore been appropriately transmitted or corrected at least with respect to the error recognition capabilities of the channel decoder. However, even valid code words may be faulty, such that the correction of the received code word permits a valid code word to be generated by means of said channel decoder, but with incorrect contents due to an incorrect data correction.

The terms metrics and software metrics, respectively, refer to a function or calculation transforming at least one encoding, program flow, software component, data word or code word properly within a numeric value or measure. By means of said measure, a formal comparison or an evaluation of a data word or code word is then possible. Therefore, said measure may be used as a criterion for the error probability of a valid code word in the present case.

As a result thereof, the valid code word is considered incorrect if said measure is as high as or higher than a predetermined threshold. In this case, the predetermined threshold is the criterion for the point from which the valid code word was able to be corrected by the channel decoder, and therefore to be arranged into a valid structure, but nevertheless has been mutilated by a data communication with an excessive degree of faultiness. For correction and validation, at least one of the following error protection codes may be used:

a BCH code (Bose-Chaudhuri-Hocquenghem),
a RS code (Reed-Solomon)
a RM code (Reed-Muller)
a LDPC code (Low-Density-Parity-Check).

With short code words, the use of BCH codes as error protection codes is of special advantage, where a BCH decoder will correct and verify the received code words. BCH codes are cyclic error-correction codes. With the BCH method, more than one 1-bit error can be corrected within a long code word. Encoding and decoding may be implemented by different methods. That is, encoding may be implemented by determining the remainder of two binary polynomials, while decoding may determine a binary error polynomial for determining the error site within the code word. Both methods can efficiently and cost-effectively be implemented in digital hardware.

Short code words are especially preferred if short reaction times or a high real-time requirement are desired. In this case, BCH codes can be used to advantage, since they have a high error correction rate and are easy to implement.

Moreover, the code word received may be demapped by a demapper before being processed by the channel decoder and the valid code word may be mapped by a mapper after having been processed by the channel decoder, in order to be able to compare the decoded code word to the received, noisy one, and to calculate the measure by using said metrics.

Advantageously, the data-word may be structured by such a mapping process to enable a higher data transmission rate. This also serves to better manage the increasing data flow in automation technology, such that the time delay inherent to data communication may be shortened. Moreover, a larger data volume may be transmitted via fewer channels, and a respective channel may be used for more than one data communication, for example.

The term mapping process executed in a mapper or demapper, respectively, refers to a process which converts the structure of a data word into a different structure. For example, a one-dimensional data word may be mapped into a two-dimensional, orthogonal structure, to enable a compressed transmission of said data word.

Meanwhile, if a mapping process involving a mapper or a demapper, respectively, is used, metrics may be used to obtain a measure from said received, noisy code word and the associated valid, mapped code word. The valid, mapped code word or said received, noisy code word, respectively, may be rejected and may optionally be newly requested, if said measure is as high and/or higher as a predetermined threshold.

Advantageously, a measure can also be obtained when using a mapping process, such that said mapping process enables a compressed data transmission without having to sacrifice the use of metrics. As a result thereof, contemporary, novel data communication techniques may be used which involve a high data communication rate, without compromising the high safety requirements for automation technologies, for the metric helps to achieve a significantly reduced probability of remaining bit errors.

The mapper and the demapper may use at least one of the below conversion processes or mapping processes, respectively:

a MPSK process (phase modulation including M phases/states)

a MQAM process (square-amplitude modulation including M states)

a MASK process (amplitude modulation including M states)

A OFDM process as a modulation process involving a plurality of orthogonal carrier signals may, in combination with at least one of a PSK process, ASK process and OFDM process, advantageously enable the division of data words into a plurality of partial word data streams, and their optionally parallel transmission via orthogonal carrier signals or carrier frequencies at a higher transmission rate.

With the 4PSK process or QPSK process, a transmission at 2 bits per transmission symbol is possible. As a result thereof, the utilization of the available bandwidth is doubled. It may be assumed that B is a bit stream of a length K for transmission. Such a bit stream B may be encoded into a code word having a length of N by said channel encoder, which code word is then mapped into a complex symbol stream having a length of N/2 by said QPSK mapper. Upon transmission via said channel, the receiver receives noisy, complex receipt symbols R. Said receipt symbols are converted to a code word C by said QPSK demapper and checked for validity by said channel decoder and corrected into a bit stream C', if necessary, which may then again be mapped into a complex symbol stream M' by said QPSK mapper. Provided that said channel decoder has been able to correct all errors, the following is true: M=M' and C=C''.

Furthermore, at least one of the below calculations may be used for said metrics:

a calculation of the sum of the squared Euclidian distance (SED), a calculation of the sum of the squared circular distance (SCD), a calculation of the nth root of SED, a calculation of the nth root of SCD.

The metrics will compare the received code word R to a valid code word or said mapped, valid code word M', respectively. It is possible to perform a calculation of the squared, Euclidian distance (SED) as said metrics, according to $$m = \Sigma |R - M'|^2$$

If a QPSK process is used, for example, said SED metrics will calculate the sum of squared amounts between said N/2 components of said noisy and corrected symbol stream. Advantageously, the SED metrics can be approximated by the sum of squared lengths of circle segments (SCD) between symbol streams when using a QPSK process. The SCD metrics follows the following formula:

$$m = \sum \left( \arg\left(\frac{R}{M'}\right) \right)^2$$

Moreover, the threshold may be determined on the basis of the signal-to-noise ratio, the frame repetition rate, the desired or necessary probability of residual bit errors downstream of said metrics and/or the initial bit rate upstream of said channel decoder, wherein the initial bit error depending from the signal-to-noise-ratio.

After passing the channel decoder, the initial bit error rate upstream of said channel decoder is reduced to the final bit rate downstream of said channel decoder. By multiplying the output bit error rate with the metrics process error rate, the probability of residual bit errors is obtained. The initial bit error rate as well as the metrics process error rate and the channel decoder depend on the signal-to-noise ratio, wherein also the frame repetition rate has to be considered, for it imposes a general framework for the permissibility of newly requesting code words declared to be incorrect. If the frame repetition rate is 10, for example, an average of one frame out of 1000 transmission frames is permitted to be declared incorrect and be newly requested. Therefore, the threshold may be chosen in the light of economic as well as safety-related aspects. In case of an increase of frame repetition rate, for example, it is possible to achieve a lower probability of residual bit error, since a higher average number of transmission frames are allowed to be newly requested. In this case, data safety would be increased at the expense of profitability or availability. It is, however, also possible to adapt the desired probability of residual bit error on the basis of the desired application and mutually dependent from the minimum signal-to-noise ratio required and the maximum frame repetition rate permitted, by shifting said threshold.

Advantageously, it is also possible to adopt said measure for estimating the signal-to-noise ratio, especially in case of using SCD metrics or SED metrics. As a result thereof, the signal-to-noise ratio can be estimated more exactly, and the technical effort is also advantageously reduced due to the multiple use of said measure.

Another typical reason for estimating the signal-to-noise ratio in this way lies in the fact that said signal-to-noise ratio cannot be exactly determined, since it is a statistic noise process. Depending on the expense, estimations may have a different degree of exactness.

Moreover, the estimation of the signal-to-noise ratio may be based on a pilot estimation or a blind estimation.

Signal-to-noise ratios based on a pilot estimation, for example, use the SCLS metrics and its measure from a received one and the same transmitted pilot symbols known to the receiver. As a result thereof, the signal-to-noise ratio can be determined more exactly on the basis of pilot symbols, especially in the case of high noises. However, this approach has the disadvantage that a higher amount of pilot symbol data has to be transmitted in this case, which affects data channel rates. In a blind estimation, the distance between received symbols and decisive symbols has to be calculated. If a channel noise is low and no symbol is mutilated into another one, the blind estimation provides the same results as the pilot estimation. If metrics are used for performing a signal-to-noise ratio estimation, it provides the same results as a pilot estimation, as long as the channel decoder is able to correct each transmission error. If the number of errors caused by the channel exceeds the amount which can be corrected by the channel decoder, the quality of the metrics-based signal-to-noise ratio estimation approximates the quality of the blind estimation. When using metrics, the blind estimation is improved in at least some of its areas, without having to introduce pilot symbols or further complexity.

Furthermore, in a broad aspect of the invention, a receiver and/or a transmitter is suggested which has a components which uses metrics as described above.

With this kind of receiver or transmitter it is possible to configure a communication system having the above indicated advantages. Said communication system may be adjusted by means of a threshold and by considering the minimum signal-to-noise ratio required and the maximum frame repetition rate admissible, wherein economic as well as safety-relevant aspects can be taken into account.

Further important features and advantages of the present invention can be derived from the dependent claims, the figures and the associated description of the figures with respect to the drawings.

Preferred embodiments of the present invention are illustrated in the drawings and will be described in more detail in the description given below, wherein similar reference signs are assigned to identical or similar components. Dimensions or relations of components derived from said drawings are not necessarily limiting.

In the schematic drawings:

FIG. 1 is a communication process using metrics according to the invention,

FIG. 2 is a probability density curve on the basis of a normalized metrics,

FIG. 3 is a cumulative density curve on the basis of normalized metrics,

Figure 4:
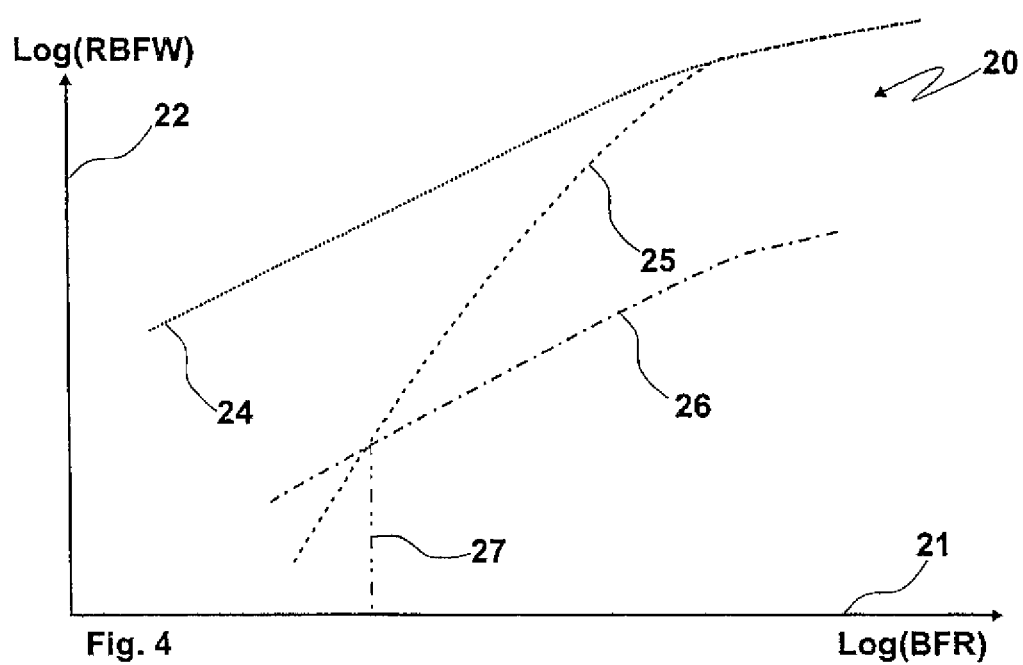
FIG. 4 shows a plurality of probabilities of residual bit error curves on the basis of an initial bit error rate from a channel decoder.

In a communication process 1 of FIG. 1 a code word C is transmitted to a receiver 3 from a transmitter 2. This communication process 1 may be configured to be bi-directional, such that communication from said transmitter 2 to said receiver as well as from said receiver 3 to said transmitter 2 is possible. Here, the transmitter 2 as well as the receiver 3 may be configured to comprise only one transmitter 2 and one receiver 3, respectively. As a result thereof, process steps described below may be performed on said transmitter 2 as well as on said receiver 3, since both components 2, 3 are able to receive a code word C. Said code word C is a bit stream B which has been encoded by a channel encoder, not illustrated, before its transmission by transmitter 2.

By means of a mapper 4, especially a QPSK mapper, it is possible to convert said code word C into a mapped code word M and to transmit the same on a channel 5 to said receiver 3. The receiver 3 receives a received, noisy code word R. This received noisy code word R is converted by a demapper 6, especially a QPSK demapper, into a demapped received code word C'. This demapped received code word C' is corrected to a code word C" and verified for validity by a channel decoder 7. If this step determines that the demapped, decoded code word C" is invalid, the received, noisy code word R is rejected and once more requested from transmitter 2, if necessary. If the channel decoder 7 determines that the demapped, decoded code word C" is valid, it will then be converted to a mapped code word M' on the receiver 3 side by said mapper 4'. By metrics 8 the received, noisy and mapped code word R is then combined with the decoded and mapped code word M' and processed into a measure Z. Said measure Z is a criterion for the probability of errors of the valid code word C". If said measure Z is in an expected range, the code word C" is categorized as valid and released for further processing.
I In a probability density chart 9 shown in FIG. 2, a normed metrics (NM) is plotted on an abscissa 10, and a probability density (WD) is plotted on an ordinate 11. A curve shape 12 for correct decoding (C=C") is plotted on the probability density chart 9 as well as a curve shape 13 for incorrect decoding (C<>C"). Both curves 12, 13 overlap in an overlapping range. If a measure Z lies in this overlapping range 14, this means that the probability for a correct decoding (C=C") and for an incorrect decoding (C<>C) are about as high. In this case, the ratio between the initial bit error rate of metrics 8 and the final bit error rate of metrics 8 is the metrics bit error rate. This metrics bit error rate has then to be multiplied with the initial bit error rate downstream of the channel decoder, in order to obtain the probability of residual bit errors of the entire process. In this way, the bit error rate of the channel decoder 7 can be improved by means of metrics 8, such that a process can be achieved which, as a whole, has a lower probability of residual bit errors than a process involving only a channel decoder 7.

In a cumulative probability-of-density chart 15, as shown in FIG. 3, the normed metrics is plotted on abscissa 10, and the cumulative probability density (CD) is plotted on ordinate 16. The curve shape 17 for the correct encoding and the curve shape 18 for the incorrect encoding result from curve shapes 12, 13 of FIG. 2 Here, curve shape 12 is integrated inversely to curve shape 17 and curve shape 13 to curve shape 18. This cumulative probability-of-density chart also shows the overlapping range 14. If a threshold 19 is chosen, this adjusts the metrics bit error rate as well as a metrics frame repetition rate, which substantially influences the entire probability of residual errors and frame repetition rate. By shifting the threshold 19, the probability of residual bit errors can therefore be adjusted at a given signal-to-noise ratio and chosen frame repetition rate. In this case, all decoded code words C" whose measures are as high as or higher than said threshold are rejected.

An intersection of said threshold 19 and the curve shape 18 for incorrect encoding renders the ratio between initial bit error rate upstream of said metrics 8 and the initial bit error rate downstream of said metrics 8 and therefore the metrics bit error rate which is used to multiply said final bit error rate downstream of said channel decoder in order to obtain the probability of residual error of the entire process.

A probability-of-residual-bit error chart 20, as shown in FIG. 4, shows the correlation between the probability of residual bit errors (RBFW) and the initial bit error rate (BRF) upstream of the channel decoder 7 on the basis of the mapping process and/or encoding process used as well as the signal-to-noise ratio. In the probability-of-residual-bit-errors chart 20, the abscissa shows the logarithmic initial bit error rate upstream of said channel encoder, and the ordinate 22 shows the logarithmic probability of residual errors. A curve shape 24 shows the behavior in case of a process which uses encoding without metrics 8. As a result thereof, the probability of residual error evident from curve shape 24 corresponds to the initial bit error rate downstream of the channel decoder 7. A curve shape 25 shows the curve of the probability of residual bit errors when using a channel decoder 7 and metrics 8, the threshold 19 according to FIG. 3 being formed on the basis of the signal-to-noise ratio such that the intersection of curve shape 17 for the correct encoding with said threshold 19 shows the same value. Stated otherwise, in this case the proportion of code words which are correct, but rejected for reaching or exceeding the threshold 19 is constant. The curve shape 26 shows the probability of residual error in a process which uses a channel decoder and a constant threshold 19. If a variable threshold value 19 and a channel decoder 7 are used, the curve shape 25 may be used at a desired probability of residual bit errors, which can be derived from the ordinate, in order to determine the maximum initial bit error rate in said channel decoder 7 and therefore the minimum signal-to-noise ratio required. Moreover, the threshold value for this initial bit error rate which has to be set for curve shape 26 can be determined. This is of course under the proviso of taking into account the respective frame repetition rates chosen. Accordingly a threshold value 27 can be chosen for the maximum initial bit error rate admissible.

Embodiment:

When using a DQPSK mapping process (differential QPSK) and in case of SCD metrics and a (63, 45) BCH encoding process, a maximum probability of residual bit errors of $10^{-8}$ and a maximum frame repetition rate of $10^{-3}$ are preset. These frame conditions can be achieved at a threshold value of Z=13.59 at a signal-to-noise ratio of 1.86 dB.

If, for example, the maximum probability of residual bit error admissible is to be further lowered for a particularly sensitive application, the threshold 19 has to be redetermined and the resulting minimum signal-to-noise ratio has to be obtained.

I claim:

1. A process for transmitting digital data, in particular for automation technology, the process comprising steps of:
   receiving a digital, noisy code word via a channel so that the digital, noisy code word is a received code word;
   correcting the received code word via a channel decoder to form a corrected code word;
   verifying the corrected code word for validity via the channel decoder in that if the corrected code word is as high as or higher than a first threshold value the corrected code word is rejected, and if the corrected code word is lower than the first threshold value the corrected code word is further processed as a validated code word;
   obtaining a measure by combining said received code word and said validated code word via a performance of metrics; and
   verifying the measure in that if said measure is as high as or higher than a second threshold value the received code word is rejected, and if said measure is less than the second threshold value the measure is released for further processing.

2. The process according to claim 1, wherein at least one of the below error protection codes is used by the channel decoder for the correcting of the received code word and the verifying of the corrected code word:
   a Bose-Chaudhuri-Hocquenghem process;
   a Reed-Solomon code);
   a Reed-Muller code; and
   a Low-Density-Parity-Check code.

3. The process according to claim 1, further comprising steps of:
   demapping the received code word via a demapper before the received code word is corrected via said channel decoder; and
   mapping the validated code word via a mapper before said validated code word is combined with said received code word.

4. The process according to claim 3, wherein said mapper and said demapper use at least one of the below conversion processes for said mapping and said demapping, respectively:
   a phase modulation process with M phases/states;
   a square-amplitude-modulation process with M phases/states; and
   an amplitude modulation process with M phases/states.

5. The process according to claim 1, wherein said metrics involves at least one of the below calculations:
   a calculation of the sum of squared Euclidian distance;
   a calculation of the sum of squared circular distance;
   a calculation of the nth root of the sum of squared Euclidian distance; and
   a calculation of the nth root of the sum of squared circular distance.

6. The process according to claim 1, wherein said second threshold value is determined on the basis of a signal-to-noise ratio, a frame repetition rate, a desired probability of residual bit errors downstream from said metrics and/or an initial bit error rate upstream of said channel decoder.

7. The process according to claim 1, further comprising a step of:
   using said measure to estimate a signal-to-noise ratio.

8. The process according to claim 7, wherein a quality of said estimation of said signal-to-noise ratio is between a pilot estimation and a blind estimation.

9. A receiver configured to perform the process recited in claim 1.

10. A transmitter configured to perform the process recited in claim 1.

11. The process according to claim 1, further comprising a step of:
   if the corrected code word is rejected via the channel decoder, requesting from a transmitter another digital, noisy code word via a receiver performing said process.

12. The process according to claim 1, further comprising a step of:
  if the measure is rejected, requesting from a transmitter another digital, noisy code word via a receiver performing said process.

13. A process for transmitting digital data, in particular for automation technology, the process comprising steps of:
  receiving a digital, noisy code word via a channel so that the digital, noisy code word is a received code word;
  demapping the received code word via a demapper before the received code word is corrected via a channel decoder;
  correcting the demapped code word via said channel decoder to form a corrected code word;
  verifying the corrected code word for validity via the channel decoder in that if the corrected code word is classed as an invalid code word, the corrected code word is rejected, optionally requesting from a transmitter the digital, noisy code word once more, and if the corrected code word is not classed as an invalid code word, the corrected code word is further processed as a validated code word;
  mapping the validated code word to form a mapped code word;
  obtaining a measure by combining said received code word and said mapped code word via a performance of metrics; and
  verifying the measure in that if said measure is as high as or higher than a predetermined threshold value the received code word is rejected, and optionally requesting from the transmitter the digital, noisy code word once more, and if said measure is less than the predetermined threshold value the measure is released for further processing.

* * * * *